A. L. McDONALD & D. L. MIDDLETON.
MEANS FOR AUTOMATICALLY INFLATING PNEUMATIC TIRES.
APPLICATION FILED MAY 28, 1913.
1,092,068.
Patented Mar. 31, 1914.
2 SHEETS—SHEET 1.
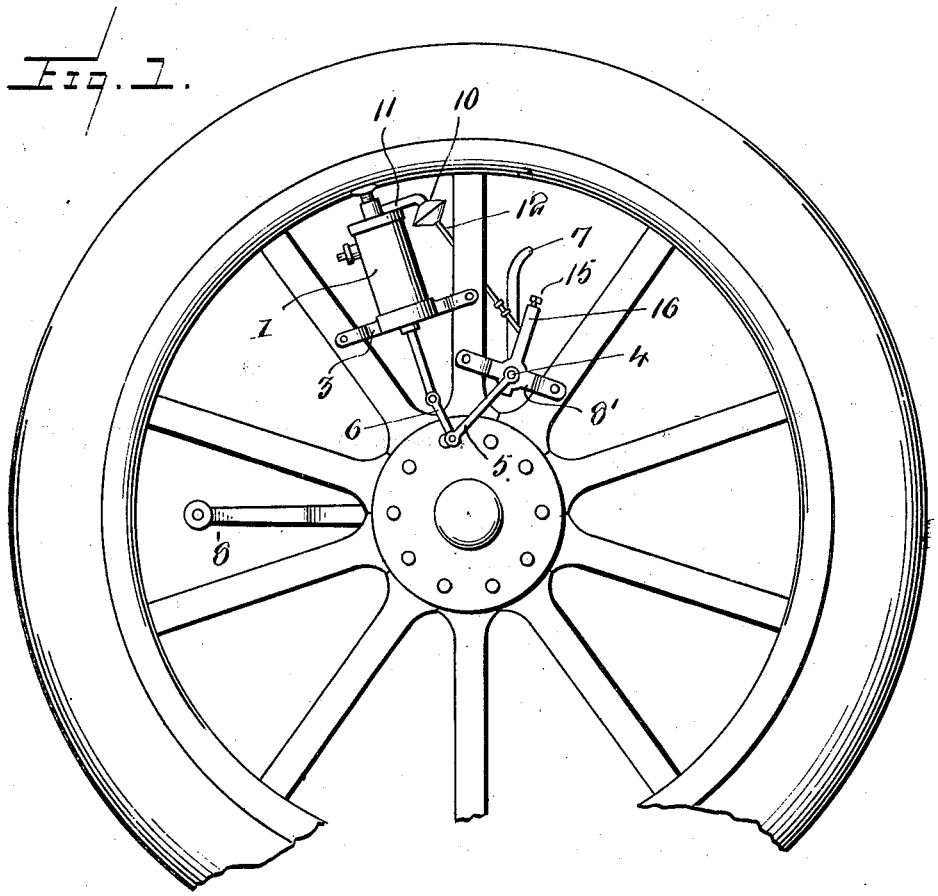
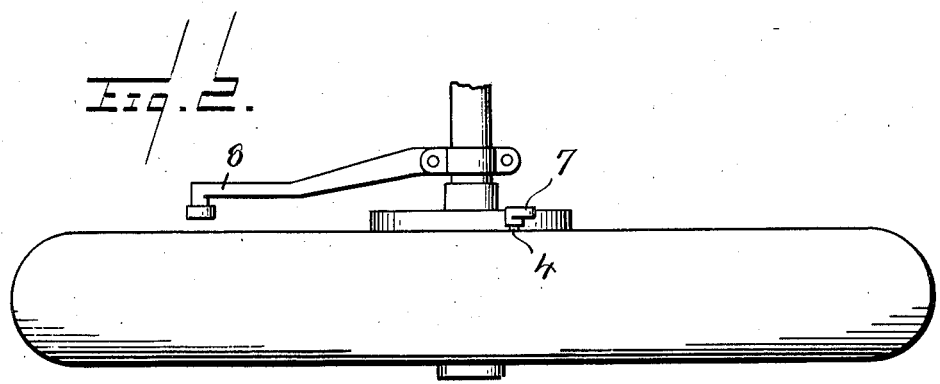
Witnesses
E. R. Ruppert.
V. B. Hillyard.
Inventors
A. L. McDonald
D. L. Middleton
By Victor J. Evans
Attorney

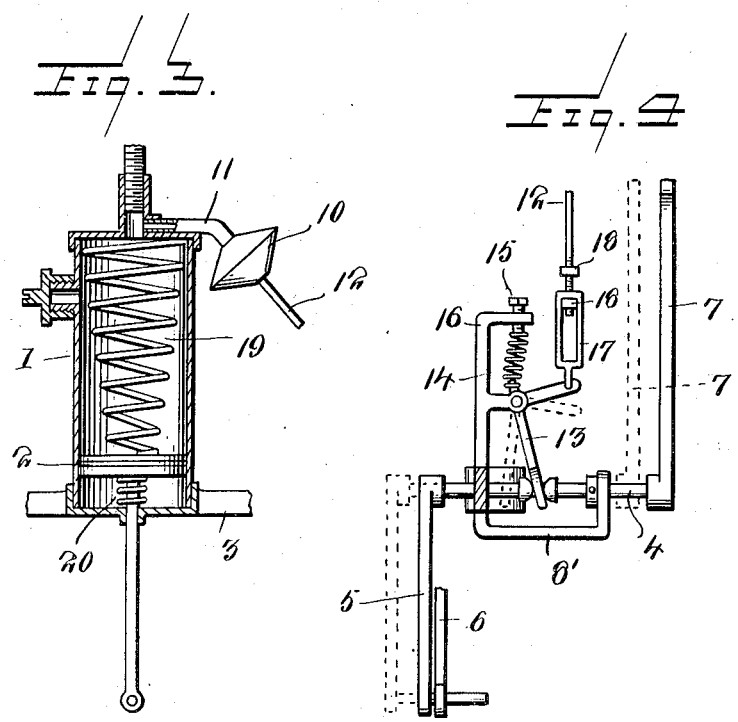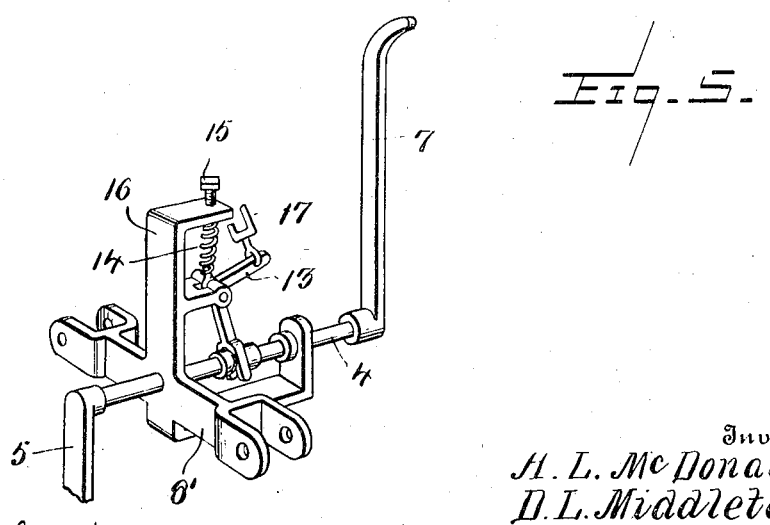

UNITED STATES PATENT OFFICE.

ADDIE L. McDONALD AND DAVID L. MIDDLETON, OF SANDERSON, FLORIDA.

MEANS FOR AUTOMATICALLY INFLATING PNEUMATIC TIRES.

1,092,068.  Specification of Letters Patent.  Patented Mar. 31, 1914.

Application filed May 28, 1913. Serial No. 770,407.

*To all whom it may concern:*

Be it known that we, ADDIE L. McDONALD and DAVID L. MIDDLETON, citizens of the United States, residing at Sanderson, in the county of Baker and State of Florida, have invented new and useful Improvements in Means for Automatically Inflating Pneumatic Tires, of which the following is a specification.

The purpose of this invention is the provision of means for automatically inflating pneumatic tires such as commonly provided for automobiles, motorcycles and analogous machines.

The invention provides means of the character and for the purpose hereinbefore stated which may be readily fitted to any make or style of machine, said means embodying an air compressor, operating means for actuating the movable part of the compressor, and means for automatically throwing the operating means into or out of action and controlled by the pressure of the air within the tire, thereby preventing excessive internal pressure.

In the preferred form of the invention the air compressor consists of a pump and the operating means includes a shaft which is mounted both to oscillate and to move longitudinally, said shaft being supplied with an arm which is arranged to engage with a suitable trip mounted upon the frame or other convenient part of the machine, the operating arm being thrown into or out of the path of the trip by the longitudinal movement of the shaft, the latter movement being effected by controlling means acted upon by the pressure of the air within the tire, said controlling means embodying a spring governor which may be set to be operated when the desired pressure within the tire is reached.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a view in elevation of a vehicle wheel provided with a pneumatic tire adapted to be automatically inflated by means embodying the invention, showing a portion of the machine sufficient for supporting the trip. Fig. 2 is a top plan view of the parts shown in Fig. 1. Fig. 3 is a cross sectional view, showing more clearly the air compressor and operating means therefor. Fig. 4 is a detail view, showing the automatic control whereby the compressor operating means is thrown into or out of active position. Fig. 5 is a detail view, showing more clearly the automatic control.

Corresponding and like parts are referred to in the following description, and indicated in all the views of the drawings, by the same reference characters.

While the invention contemplates the use of any type of air compressor for convenience that illustrated consists of a cylinder 1 and piston 2, the latter being arranged to reciprocate within the cylinder and adapted to be automatically operated when the machine, vehicle or like part is in operation. The cylinder 1 is secured to the wheel in any manner and is connected to the usual air valve by means of which the tire is inflated. As shown the air compressor is connected to adjacent spokes of the wheel by means of a short bar 3. A shaft 4 is mounted upon the wheel to receive both an oscillatory or rocking movement and a longitudinal movement. An arm 5 at one end of the shaft 4 is connected by means of a link 6 with the stem of the piston 2 so as to operate the latter when the shaft is oscillated or rocked. An operating arm 7 is fitted to the opposite end of the shaft 4 and is arranged to be engaged by means of a trip 8 attached to a convenient part of the machine or vehicle. The shaft 4 is mounted in a bearing 8ᵃ which is secured to spokes of the wheel. The trip 8 may be of any construction and as shown consists of an arm which is clipped to the axle of the machine, the part of the trip arranged to be engaged by the operating arm 7 being provided with a roller or small wheel to reduce the friction to the smallest amount possible.

In order to prevent excessive inflation of the tire an automatic control is provided and arranged to be actuated by the pressure of the air within the tire so that when the predetermined pressure has been reached the automatic control comes into play to throw the air compressor out of action. This automatic control embodies an expansible device 10 which is connected by means of a tube 11 with the connection between the compressor and air valve of the tire. The expansible device 10 may consist of a bulb or other pneumatic appliance capable of being expanded by the pressure of air. A rod 12 connects the movable part of the expansible device 10 with one arm of a bell crank 13, the other arm of such bell crank being in engagement with the shaft 4 so as to effect a longitudinal movement thereof. A spring 14 of the expansible type has one end engaging an arm of the bell crank 13 to which the rod 12 is attached, the opposite end of said spring being connected to a set screw 15 threaded into a bracket 16 whereby the tension of the spring 14 may be varied and adjusted according to the required pressure of air within the tire. When the device 10 expands by the pressure of the air within the tire the bell crank 13 is operated and moves the shaft 4 to throw the operating arm 7 out of the path of the trip 8 and when the pressure of air within the tire falls below that for which the spring 14 is set the latter moves the bell crank 13 to throw the operating arm 7 within the path of the trip 8. The connecting rod 12 is constructed so as to have a limited play before operating the bell crank 13 and as shown such rod comprises two sections, one of the sections, as 17, having a loop through which the other section passes, the last mentioned section having adjustable stops 18 between which the part of the loop through which the section provided with the stops 18 passes has a limited play.

When adapting the invention to a pneumatic tire the trip 8 is secured to a convenient part of the running gear of the vehicle or machine and the compressor and concomitant parts are secured to the wheel to which the tire is fitted, the compressor being connected with the air valve of the pneumatic tube or tire in any convenient way. The parts are arranged so that during the rotation of the wheel the operating arm 7 is engaged by the trip 8, thereby rocking or oscillating the shaft 4 and actuating the compressor. The operating arm 7 is moved in one direction by the trip 8 and is moved in the opposite direction by means of a spring which in the present instance is indicated at 19, the same being expansible and located in the inner end of the cylinder 1. A rear coil spring 20 is located in the outer end of the cylinder to form a buffer for the piston on its out or return stroke. When the predetermined pressure within the tire has been reached the device 10 will expand against the tension of the spring 14 and move the shaft 4 so as to throw the operating arm 7 out of the path of the trip 8 so that the wheel may rotate without causing any operation of the compressor. When the air pressure within the tire falls below the given point the spring 14 moves the shaft 4 to throw the operating arm 7 into the path of the trip, thereby bringing the compressor into action upon the rotation of the wheel.

A coupling 21 is located at one side of the cylinder 1 near the outer end thereof and admits of an air pump or other type of compressor being attached to the cylinder 1 in the event of the piston operating mechanism becoming inoperative from any cause, so that the tire may be properly inflated by hand.

From the foregoing description, taken in connection with the accompanying drawings, the advantages of the construction and of the method of operation will be readily apparent to those skilled in the art to which the invention appertains, and while we have described the principle of operation of the invention, together with the device which we now consider to be the best embodiment thereof, we desire to have it understood that the device shown is merely illustrative, and that such changes may be made when desired as are within the scope of the claims appended hereto.

Having thus described the invention what is claimed as new, is:—

1. In means for automatically inflating a pneumatic tire the combination of a compressor, a shaft mounted to receive both a rocking and a longitudinal movement, connecting means between such shaft and compressor, an operating arm having connection with the shaft, a trip arranged in the path of the operating arm, and an automatic control actuated by the pressure of air within the tire for moving the shaft longitudinally to throw the operating arm out of the path of the trip.

2. In means for automatically inflating a pneumatic tire the combination of a compressor, a shaft mounted to receive both a rocking and a longitudinal movement, connecting means between such shaft and compressor, an operating arm having connection with the shaft, a trip arranged in the path of the operating arm, a spring normally tending to move the shaft in one direction to hold the operating arm in the path of the said trip, means for varying the tension of said spring, and an automatic control adapted to be operated by the pressure of air within the tire for moving the shaft against the tension of the before mentioned spring to throw the operating arm out of the path of the trip when the air pressure within the tire reaches a given point.

In testimony whereof we affix our signatures in presence of two witnesses.

ADDIE L. McDONALD.
DAVID L. MIDDLETON.

Witnesses:
T. D. RIGDON,
W. H. ROSIER.